(12) United States Patent
Kayal et al.

(10) Patent No.: US 10,684,940 B1
(45) Date of Patent: Jun. 16, 2020

(54) MICROSERVICE FAILURE MODELING AND TESTING

(71) Applicant: Amazon Technologies, Inc., Seattle, WA (US)

(72) Inventors: Akash Kayal, Seattle, WA (US); Joshua Chittle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 16/134,752

(22) Filed: Sep. 18, 2018

(51) Int. Cl.
  *G06F 9/44* (2018.01)
  *G06F 11/36* (2006.01)
  *G06N 20/00* (2019.01)

(52) U.S. Cl.
  CPC ........ *G06F 11/3664* (2013.01); *G06F 11/368* (2013.01); *G06F 11/3688* (2013.01); *G06N 20/00* (2019.01)

(58) Field of Classification Search
  CPC ............ G06F 11/3664; G06F 11/3688; G06F 11/368; G06N 20/00
  USPC ...................................................... 717/125
  See application file for complete search history.

(56) References Cited

U.S. PATENT DOCUMENTS

| | | | |
|---|---|---|---|
| 9,021,008 B1* | 4/2015 | Andrus | H04L 43/50 709/201 |
| 10,216,558 B1* | 2/2019 | Gaber | G06F 11/0727 |
| 10,495,544 B1* | 12/2019 | Billing | F02P 17/12 |
| 2020/0026538 A1* | 1/2020 | Cui | G06F 11/203 |

OTHER PUBLICATIONS

Heordiadi, et al. Gremlin: Systematic Resilience Testing of Microservices, IEEE 36th International Conference on Distributed Computing Systems (2016) DOI 10.1109/ICDCS.2016.11.

* cited by examiner

*Primary Examiner* — Anna C Deng
(74) *Attorney, Agent, or Firm* — Knobbe Martens Olson & Bear, LLP (57) ABSTRACT

Generally described, one or more aspects of the present application correspond to an artificial intelligence (AI) system that helps developers build failure-resilient microservices. The AI system can analyze the code of a microservice to identify other, similar microservices, and then use historical data about performance of those similar microservices to build a failure model for the microservice. The AI system can also automatically run failure tests based on the failure model, and can suggest code changes (based on analyzing historical code changes and test performance data) that can help a microservice become resilient to a particular failure.

18 Claims, 4 Drawing Sheets

MICROSERVICE FAILURE MODELING AND TESTING

BACKGROUND

Software engineering has seen recent advances in large-scale, distributed software systems. Even when all of the individual services in a distributed system are functioning properly, the interactions between those services can cause unpredictable outcomes. Unpredictable outcomes, compounded by rare but disruptive real-world events that affect production environments, make these distributed systems inherently chaotic. Software developers seek to identify the weaknesses of such distributed systems before they manifest as system-wide, aberrant behaviors that impact the performance of the system. Systemic weaknesses can include improper fallback settings when a service is unavailable, retry storms from improperly tuned timeouts, outages when an upstream or downstream service receives too much traffic, and cascading failures based on a single point of failure. Chaos engineering is the discipline of analyzing and improving the reliability such distributed systems by causing "chaos" to observe the behavior of the system during controlled experiments. Chaos can represent real-world events such as severed network connections, dropped packets, crashed servers, hard drive malfunctions, and spikes in network traffic, to name a few examples.

DETAILED DESCRIPTION

Generally described, the present disclosure relates to an artificial intelligence service for generating microservice failure models, testing microservice performance, and generating performance reports and/or suggested code changes relating to tested microservices. A "microservices architecture" is generated by an application development framework that structures an application (e.g., computer software designed to perform a group of coordinated functions or tasks) as an ecosystem of interacting services (referred to herein as microservices) that can be executed by a hardware processor to collectively perform the functions of the application. Each microservice can be a set of executable code that performs a particular function or action of the larger application. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another.

Software is typically tested prior to deployment to verify that it operates as expected or intended. Existing solutions for testing individual microservices can enable users to select from among a large collection of targeted scripts (or other executable code) that simulate specific actions involving the microservice and/or its execution environment, in order to test whether its performance will degrade or fail in response to certain events. These targeted scripts can simulate, for example, operating conditions on the host computing device running the microservice (e.g., errors associated with memory usage), actions on the communication network used by the microservice (e.g., errors associated with dropped packets, high volume of network traffic), and actions associated with other networking components (e.g., a malicious attack). The microservice developer can analyze the result of running the selected target scripts and determine whether modification to the code of the microservice is warranted. However, the large quantity of available tests can cause confusion for developers regarding where to start or best practices of what to test for their particular type of microservice. In addition, the developers of a particular microservice may not intuitively recognize how to modify their microservice code in response to learning of simulated failure conditions, and further may not be aware of the upstream or downstream effects of their code modifications within the larger application ecosystem.

The above described problems, among others, are addressed in some embodiments by the disclosed artificial intelligence ("AI") failure model agent that designs and manages microservice failure model testing. For example, a developer (or other user) can indicate to the AI failure model agent which microservice they would like to test, such as by uploading a copy of the executable code of the microservice or pointing to a storage location of the executable code. The AI failure model agent can analyze the executable code to determine what type of microservice this is, for instance based on the capabilities, resources, and/or connectivity of the microservice. The AI failure model agent can use this determined type to identify similar microservices, and can gather observed data indicating the performance and resource utilizations of these similar microservices under different conditions. Based on this observed data relating to similar microservices, the AI failure model agent can build a failure model for the particular microservice under consideration. This failure model can specify certain conditions and the expected performance/resource usage degradations of the microservice under those conditions. Next, the AI failure model agent can either recommend or automatically run certain targeted scripts that pertain to the conditions of the failure model, in order to simulate how this particular microservice will respond to these conditions. Based on the result of these simulations, the AI failure model agent can present the user with reports indicating the simulated performance of the microservice, and may also recommend particular code changes that could address identified performance issues.

As would be appreciated by one of skill in the art, the use of an AI failure model agent, as disclosed herein, represents a significant technological advance over prior implementations. Particularly, the AI failure model agent is able to intelligently recommend and/or automatically run targeted scripts to simulate specific operating conditions that are predicted to cause failure possibilities for a given microservice, thereby reducing the number of steps required from a user to test the microservice for possible failures. Specifically, the intelligently built failure model that the AI failure model agent generates enables the agent to more efficiently run select failure tests to help build resiliency of the microservice, compared to the time and processing resources that would otherwise be used by a brute-force run of all possible failure tests. Further, the AI failure model agent can intelligently recommend executable code changes that can improve resilience of a given microservice to failures. Thus, the disclosed technology provides a tool that enables users to build resilience of microservices to failure more efficiently and with fewer requirements on the user than previous solutions. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, although described in the example context of microservice testing, the disclosed techniques can be applied to other types of software, where different softwares of a particular type share common characteristics.

Overview of Example AI Microservices Failure Testing

Figure 1:
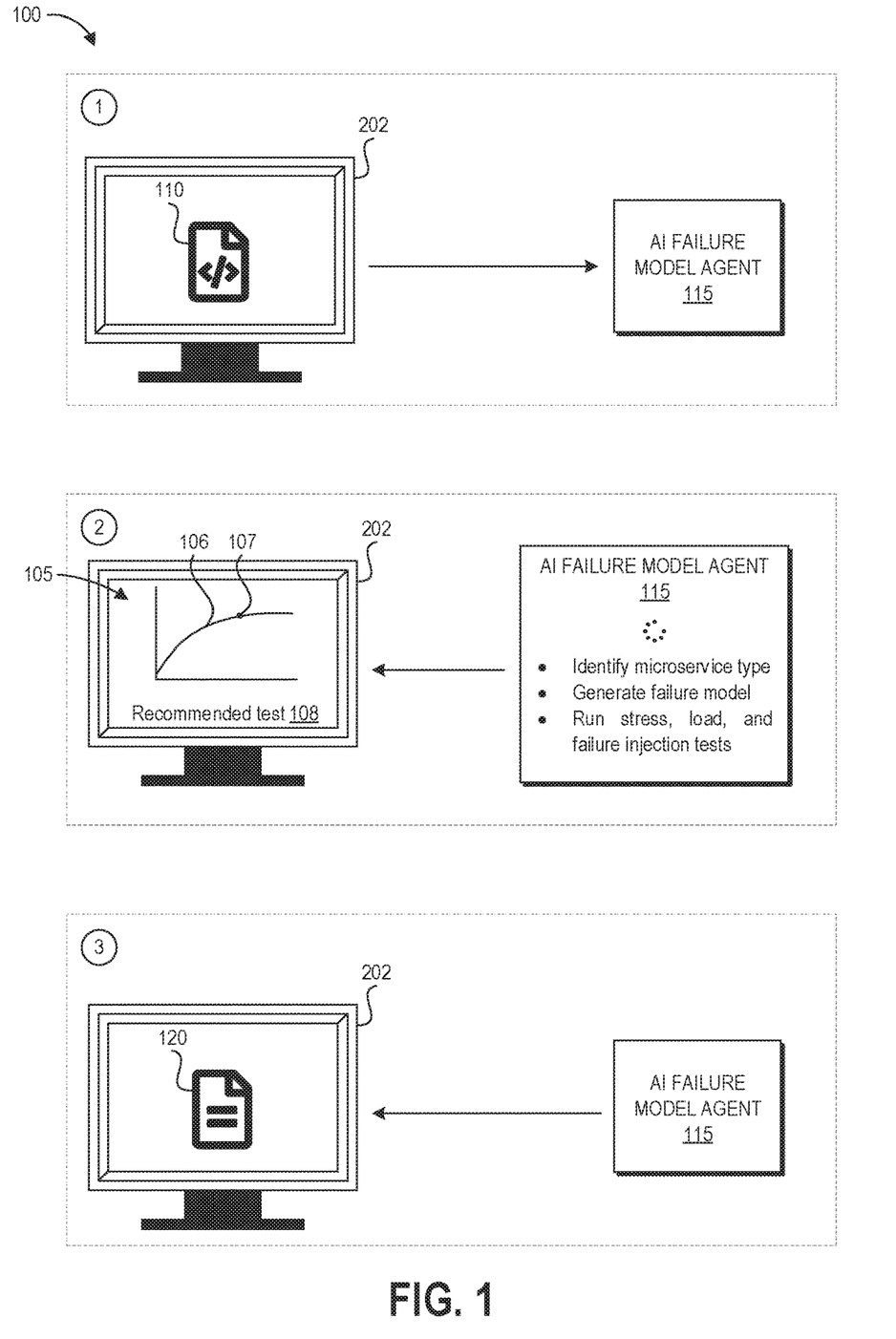
FIG. 1 depicts a graphical representation of interactions between a user and an artificially intelligent failure model agent, according to the present disclosure.

FIG. 1 depicts a graphical representation of interactions 100 between a user computing device 202 and an AI failure model agent 115, according to the present disclosure. As depicted in FIG. 1, at interaction (1) the user computing device 202 provides the executable code of microservice 110 to the AI failure model agent 115. This can occur, for example, via a first user interface that enables the user to identify (for locally executing implementations of the AI failure model agent 115) or upload (for remote executing implementations of the AI failure model agent 115) the file of executable code for the microservice for which they desire to conduct failure model testing. Although examples presented herein focus on analysis of the executable code 110, some implementations can additionally or alternatively analyze documentation describing the microservice (such as a model definition). Further, some implementations can additionally or alternatively analyze code or documentation describing the overall application architecture of which the microservice is a part, in order to additionally incorporate infrastructure failure predictions into the disclosed failure models. In some implementations, interaction (1 can be a programmatic interaction as part of a software development and deployment system (e.g., an API embodiment).

At interaction (2), the AI failure model agent 115 identifies the type (or type(s)) of the microservice 110, for example based on automated analysis of its code or software description, as described in further detail below. Based on the type(s) of the microservice 110, the AI failure model agent 115 programmatically generates a failure model 105 for the microservice 110. The failure model 105 specifies one or more possible real-world events (referred to herein as "operating conditions"), a corresponding performance impact on the microservice (referred to herein as "failure possibilities"), and optionally a probability of that performance impact occurring. For example, a failure model can specify an <operating condition, failure possibility> as <at 90% CPU usage, ability to take new requests is at 50% capacity>. As another example, a failure model can specify an <event, impact, probability> as <if 2% failure from upstream database, service requests spill over, 50%>. Generally speaking, the failure model includes a number of "if . . . then" statements tying possible real-world stress, load, or failure events to corresponding impacts on the performance of the microservice 110. As shown in FIG. 1, in some implementations the failure model 105 can be provided to the user computing device 202 for display to the user. The failure model 105 can be represented, for example, as a graph 106 that shows a prediction line representing microservice performance with a point of failure 107 due to a root cause. The failure model 105 can also be displayed with one or more recommended tests 108. The representation of the recommended test 108 can include or be accompanied by a user-selectable option that causes the AI failure model agent 115 to run the recommended test 108.

Based on this failure model, the AI failure model agent 115 can automatically select and run certain stress, load, and failure injection tests for the user computing device 202, referred to herein as "failure testing." Stress, load, and failure injection tests are referred to collectively herein as "fault-injection tests." Each fault-injection test can be a targeted script, or other executable code, configured in a way to simulate specific actions on the host computing device (e.g., the computing device executing the microservice 110), communication network (e.g., the network(s) by which the microservice 110 communicates with other microservices and resources), and with other network components. The AI failure model agent 115 can obtain targeted scripts that correspond to the events specified in the failure model, cause execution of the targeted script to simulate a stress, load, or failure condition on the microservice, and can collect information on the behavior of the microservice. In alternate implementations, the AI failure model agent 115 can indicate recommended fault-injection tests that the user can select to run, such that the user does not need to manually identify the needed tests from among a large number of possible tests.

The effects of running these fault-injection tests may be observed by monitoring behavior of the microservice 110 on a network. For example, with a microservices architecture there is an increased reliance on computer networks because multiple microservices work in coalition to generate a response to an end user's requests. As such, common types of failures can be emulated by running targeted scripts that manipulate network interactions, and the failure recovery of a microservice can be observed from the network. For example, by observing the network interactions, the AI failure model agent 115 can infer whether a microservice handles transient network outages by retrying its API calls to a destination microservice. The AI failure model agent 115 can run targeted scripts for emulation of fail-stop and crash failures, performance/omission failures, and crash-recovery failures, among others.

At interaction (3), a user computing device with an output device (e.g., a display, a computer speech output) receives a report 120 of the results of the failure testing. This can also be programmatically returned as part of an API. The report can include the hypothesis (e.g., the if/then <operating condition, failure possibility> predictions of the failure report), whether the hypothesis was proved (e.g., the expected failure possibility was observed after the operating condition) or disproved (e.g., the expected failure possibility was not observed after the operating condition), and optionally a corresponding p-value representing the probability of finding the observed failure, or a more extreme failure, when the null hypothesis is true. The report 120 can also specify a code change that could be made to the microservice 110 in order to mitigate or alleviate observed failures. Beneficially, this can guide the user to building a more resilient microservice 110.

In contrast to the interactions 100 of FIG. 1, conventional chaos engineering follows a longer series of manual steps. For example, a user wishing to test a microservice can first ask themselves what may go wrong, and based on what they can imagine they can form a hypothesis for failure testing. Next, the user can plan their testing by selecting particular targeted scripts that simulate the failures they envision may affect their microservice. In existing failure modeling systems, these targeted scripts are typically selected manually from among hundreds or thousands of options. This can be an overwhelming process, particularly for users who do not know where in the large list of scripts to start. Thereafter, the user can run their selected scripts and observe the performance of their microservice. If they observe a problem, they can modify their microservice code and test again. Once the user has run their tests at full production scale and the microservice (among other microservices of the application) run as intended, they have completed the process of building resilience. It will be appreciated that the interactions 100 of FIG. 1 represent a much more efficient and user-friendly approach to the process of building resilience.

Figure 2:
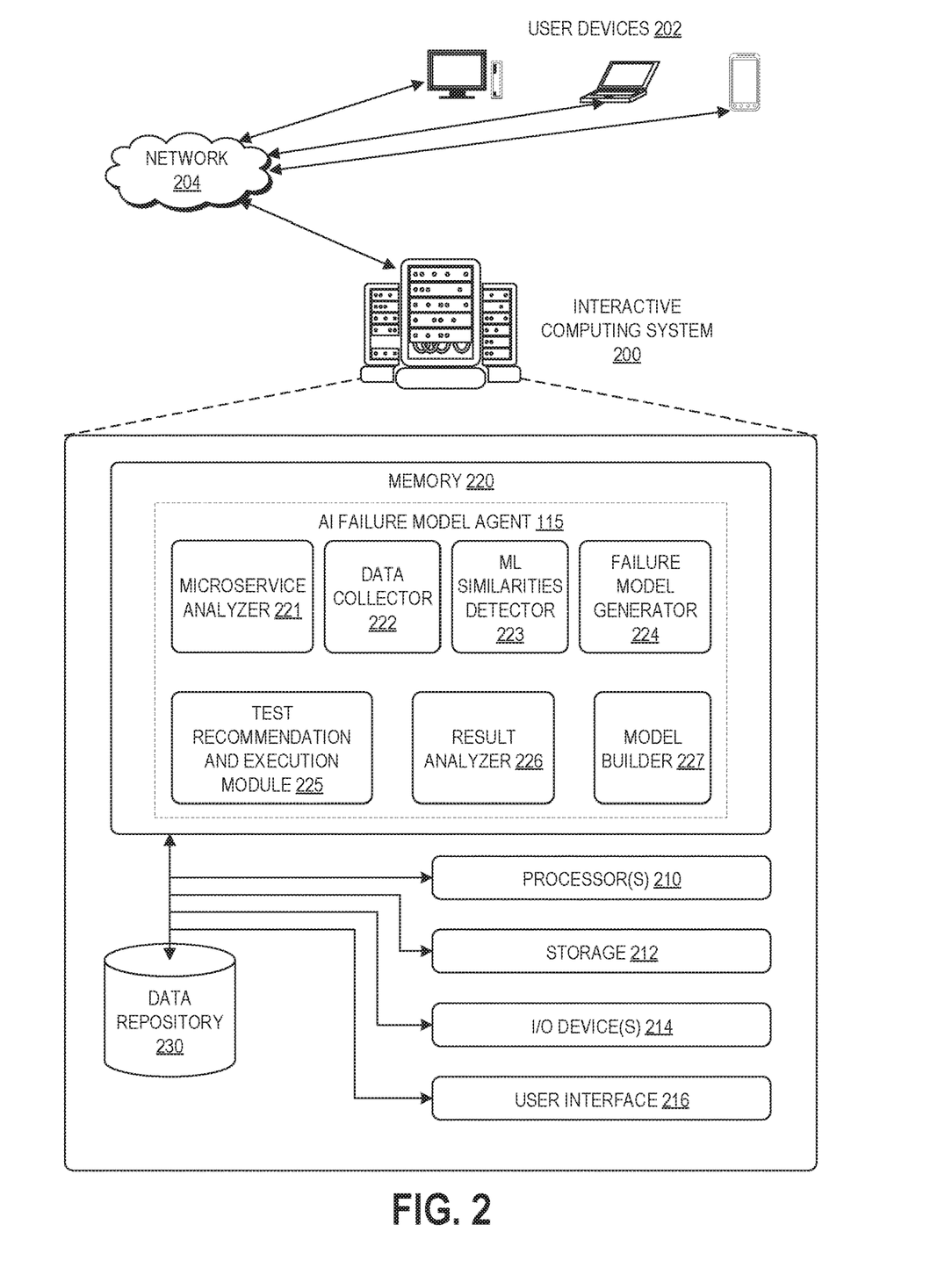
FIG. 2 depicts a schematic block diagram of a computing system that implements an artificially intelligent failure model agent, for example according to the interactions of FIG. 1.

FIG. 2 depicts a schematic block diagram of an illustrative computing system 200 configured to implements the AI failure model agent 115. The implementation illustrated in FIG. 2 represents the AI failure model agent 115 being executed on a remote computing system 200 from the user device 202. It will be appreciated that in other implementations the AI failure model agent 115 can be installed locally on a user device 202, and thus some or all of the components of the computing system 200 may be incorporated into the user device 202.

The architecture of the interactive computing system 200 includes a memory 220 in communication with a processor 210, which can be in direct communication with one another or distributed among computing devices within a networked computing system and in communication with each other. Components used for the architecture may depend at least in part upon the type of network and/or environment selected. As depicted interactive computing system 200 may include one or more computers, perhaps arranged in a cluster of servers or as a server farm. The memory and processors that make up these computers may be located within one computer or distributed throughout many computers (including computers that are remote from one another) as detailed herein. These servers may be configured to intelligently analyze and test microservices, and to inform developers regarding how to build greater resilience to failure, as described herein.

The interactive computing system 200 may include at least one memory 220 and one or more processing units (or processor(s)) 210. The memory 220 may include more than one memory and may be distributed throughout the interactive computing system 200. The memory 220 may store program instructions that are loadable and executable on the processor(s) 410 as well as data generated during the execution of these programs. Depending on the configuration and type of memory, the memory 420 may be volatile (such as RAM and/or non-volatile (such as read-only memory ("ROM"), flash memory, or other memory). In some examples, the memory 420 may include multiple different types of memory, such as static random access memory ("SRAM"), dynamic random access memory ("DRAM"), or ROM.

The memory can store the program instructions as a number of modules that configure processor(s) 210 to perform the various functions described herein, for example microservice analyzer 221, data collector 222, machine learning ("ML") similarities detector 223, failure model generator 224, test recommendation and execution module 225, result analyzer 226, and model builder. The functions of these modules are described briefly below and in further detail with respect to FIG. 3.

The data collector 222 can monitor the other components of the AI failure model agent 115 to cause storage of certain types of data in the data repository 230. For example, the data collector 222 can store microservice and infrastructure code (including multiple versions of each as testing is iterated as described herein), discovered microservice metrics, failure models, user test selections, test results data, and adopted code change suggestions. The microservice analyzer 221 can analyze the code, description, and/or infrastructure of the microservice in order to determine its attributes, and the ML similarities detector 223 can use these attributes to classify the microservice. The failure model generator 224 can look at historical data in the data repository 230 to determine what types of failures have been experienced by one or more similar microservices, and can then use this analysis to build a failure model for the microservice and/or its infrastructure. The test recommendation and execution module 225 can identify tests that correspond to the failure model, and can run these automatically or at the direction of a user. The results analyzer 226 can analyze the results of the failure testing, generate a report of the results, and optionally identify and recommend code changes that may mitigate or fix any identified failures. The model builder 227 can use historical data to build and refine the ML similarities detector 223.

The processor 210 includes one or more general purpose computers, dedicated microprocessors, graphics processors, or other processing devices capable of communicating electronic information. Examples of the processor 210 include one or more application-specific integrated circuits ("ASICs"), for example ASICs purpose built for machine learning training and/or inference, field programmable gate arrays ("FPGAs"), digital signal processors ("DSPs") and any other suitable specific or general purpose processors. The processor 210 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 200 may also include additional storage 212, which may include removable storage and/or non-removable storage. The additional storage 212 may include, but is not limited to, magnetic storage, optical disks, and/or tape storage. The disk drives and their associated computer-readable media may provide non-volatile storage of computer-readable instructions, data structures, program modules, and other data for the computing devices. The memory 220 and the additional storage 212, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 200 may also include input/output (I/O) device(s) and/or ports 214, such as for enabling connection with a keyboard, a mouse, a pen, a voice input device, a touch input device, a display, speakers, a printer, or other I/O device.

The interactive computing system 200 may also include a user interface 216. The user interface 216 may be provided over the network 204 to user devices 202 and utilized by a user to access portions of the interactive computing system 200. In some examples, the user interface 216 may include a graphical user interface, web-based applications, programmatic interfaces such as application programming interfaces ("APIs"), or other user interface configurations. The user interface 216 can include functionality for users to identify microservices to the AI failure model agent 115, and can also include reports on performance and potential microservice code changes.

The interactive computing system 200 may also include a data store 230. In some examples, the data store 230 may include one or more data stores, databases, data structures, or the like for storing and/or retaining information associated with the interactive computing system 200. The data store 230 can include data structures that store trained microservice classification models, fault-injection targeted scripts, historical fault-injection test results, and code configurations and changes of the microservices that have been tested. With respect to code changes, the data collector 222 can cause storage of a copy of the initial code for a microservice in the data repository 230 as well as a copy of the code for that microservice after it has been modified following testing. The results analyzer 226 can semantically compare these two copies of the code to identify changes to the code as a result of the testing. If the microservice improves its performance during subsequent testing, the results analyzer 226 can cause storage of the code changes in the data repository in association with (1) the type of failure that was addressed, and (2) the type of the microservice. This can enable the results analyzer 226 to suggest code changes to other users testing that type of microservice for that type of failure (or similar types of microservices and/or failures), where the suggested code changes may help the user build resilience of their microservice to that failure. Similarly, the results analyzer 226 can identify and recommend infrastructure changes that may mitigate or prevent any identified failures of the microservice infrastructure. For example, the results analyzer may recommend an infrastructure change relating to storage partitioning, security protocols, autoscaling of virtualized computing instances, or database type based on testing of infrastructure failures relating to these aspects.

For a given microservice testing workflow, the data repository 230 can include data structure(s) that store data representing microservice metrics (e.g., the determined downstream capabilities and upstream resource dependencies of the microservice), the determined type(s) of the microservice, the failure model built for that microservice, fault-injection test results, and any indicated and adopted code changes. The model builder 227 can use this data to build and refine the ML similarities detector for classifying microservices.

The interactive computing system 200 can communicate over network 204 with user devices 202. The network 204 can include any appropriate network, including an intranet, the Internet, a cellular network, a local area network or any other such network or combination thereof. User devices 202 can include any network-equipped computing device, for example desktop computers, laptops, smartphones, tablets, e-readers, gaming consoles, and the like. Users can access the interactive computing system 200 and interact with items therein via the network 204 and can be provided with recommendations via the network 204. In other implementations the interactive computing system 200 can be incorporated into a user device 204.

In some implementations, the AI failure model agent 115 itself can be structured using a microservices architecture. For example, the microservice analyzer 221, data collector 222, machine learning ("ML") similarities detector 223, failure model generator 224, test recommendation and execution module 225, result analyzer 226, model builder 227, and data repository 230 (among the other illustrated components) may each be implemented on a separate server or cluster of servers. Running the different components on different computing hosts may help with scalability of the AI failure model agent 115. In some implementations, the AI failure model agent 115 can be used to build resilience of an electronic catalog built from thousands of microservices, such as 40,000 to 50,000 microservices.

Figure 3:
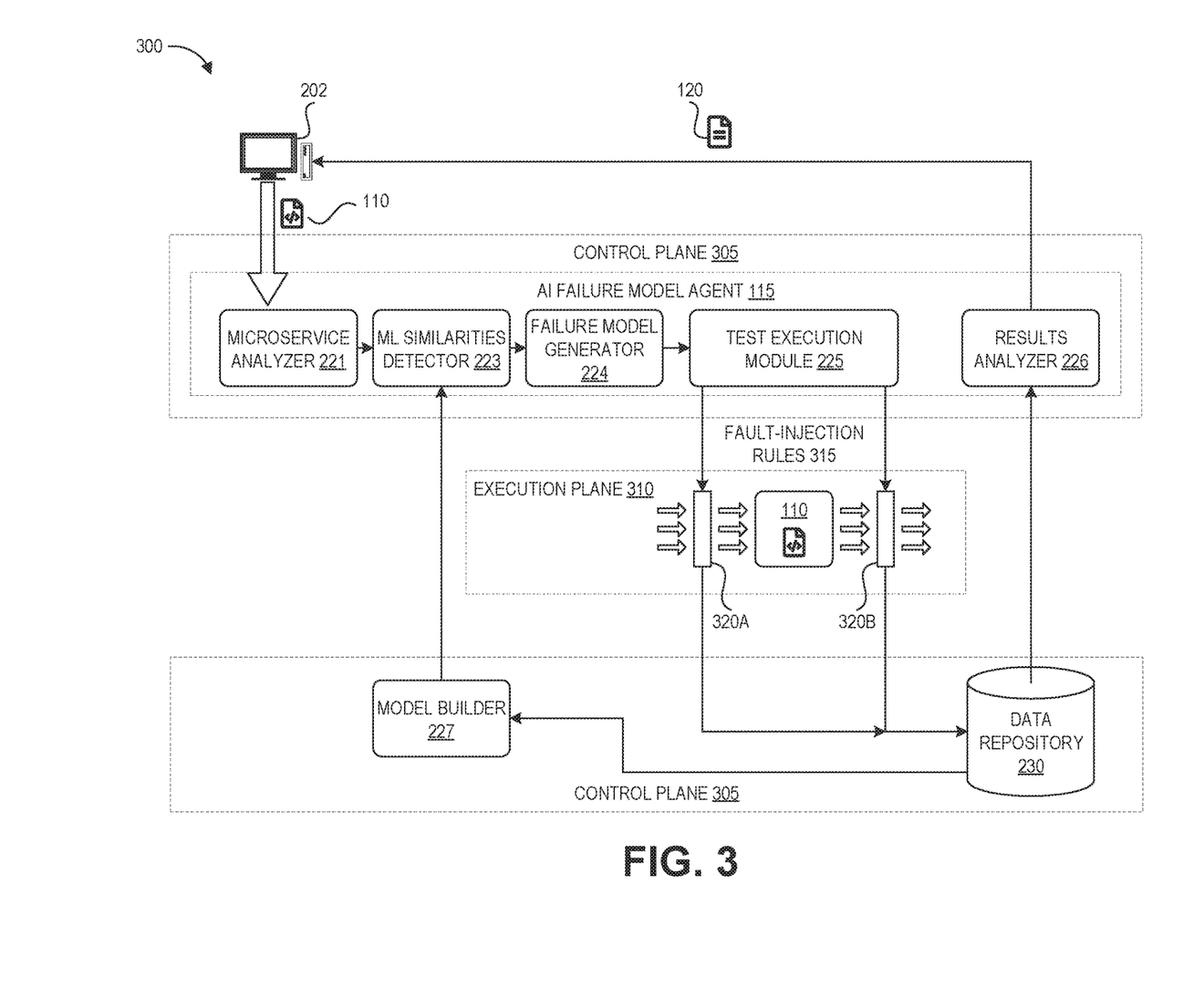
FIG. 3 depicts a schematic block diagram of a failure testing framework that implements the artificially intelligent failure model agent of FIGS. 1 and 2.

FIG. 3 depicts a schematic block diagram of implementation of the AI failure model agent 115 within a framework 300 for systematically testing the failure-handling capabilities of microservices. The framework 300 can allow users to run experiments on a software system or particular microservice by injecting specific failure mode into their hosts (e.g., the computing systems implementing the microservices). Though not illustrated, the data collector 222 can monitor the performance of the microservice 110 as it is analyzed and tested as described below to cause storage of the results in the data repository 230.

As described with respect to FIG. 1, the user computing device 202 can provide their microservice (e.g., the executable code of the microservice 110) to the AI failure model agent 115 for automated analysis and/or failure testing. The execution plane 310 of the framework 300 is where testing occurs, and can include network proxies referred to herein as fault-injection agents 320A, 320B that proxy API calls to and from the microservice and can manipulate the arguments, return values, and timing of these calls, thus acting as fault injectors. The AI failure model agent 115 can operate as part of a control plane 305 of the testing framework. The control plane sends fault injection rules 315 to these agents 320A, 320B, instructing them to inspect the messages and perform fault-injection actions (e.g., one or more of abort, delay, and modify) if a message matches a given criteria. The execution plane 310 and control plane 305 are logical constructs implemented on one or more computing devices of the interactive computing system 200.

The microservice analyzer 221 can inspect the code or a description of the microservice 110 to determine its capabilities and resources. Capabilities can include APIs supported, existing metrics emitted by the service and the APIs, service architecture such as event driven or request response, to name a few examples. Resources can include infrastructure such as load balancers, databases, dependent services, immediate code snippets, characteristics of the host hardware, and the like. The microservice analyzer 221 can also analyze connectivity, for example how many and which other microservices or resources are upstream or downstream of the microservice according to its API calls. The microservice analyzer 221 can also analyze the infrastructure of the microservice, for example which other microservices it communicates with and which resources such as database types are used by the microservice.

The ML similarities detector 223 can use these determined capabilities and dependencies (and optionally infrastructure attributes) as features to classify the type of the microservice 110. For example, despite variations in the function of different microservices, the interactions between different microservices can be characterized using a few standard patterns such as request-response, publish-subscribe, and the like. The semantics of these application-layer transport protocols and the interaction patterns may thus be shared across a number of different microservices. Because microservices can share such a similar interaction architecture, they may also share similar ways in which they can fail. Therefore, it is possible to use a trained ML algorithm (such as a clustering algorithm or neural network) to identify the type of the microservice 110 based on these features. The microservice 110 may be assigned to one or more types based on its features. For example, a clustering algorithm may assign weights to each feature in a set of microservice features, and then use the particular identified features of this microservice 110 to compute the distance between the microservice 110 and other services features. Example types include event listeners, event processors, client server systems, and batch processing (e.g., map reduce).

As shown by the loop from the data repository 230 that stores the test results, through the model builder 227, and back to the ML similarities detector 223, the data produced by testing can be used to refine the parameters of the ML similarities detector 223. Beneficially, this can train the ML similarities detector 223 to make more accurate classifications of microservices, and/or can keep the ML similarities detector 223 updated as microservice types evolve over time.

The failure model generator 224 can look at historical data in the data repository 230 (although the connection is not illustrated here for simplicity of the figure) to determine what types of failures have been experienced by one or more other microservices of the type(s) of this microservice 110, as well as other applications sharing the microservice infrastructure. This can include analyzing key performance indicator ("KPI") and resource usage of these similar microservice under different traffic and load profiles to determine specific events that may cause particular performance issues with this microservice. If an event yielded a performance impact for a similar microservice (or a threshold number or percentage of a pool of similar microservices), then the failure model generator 224 can include that <operating condition, failure possibility> as a hypothesis in the failure model of the present microservice 110. A failure model defines the ways in which a microservice can fail to perform its designed functionality, what KPIs of the microservice would be impacted, and whether the service can operate in the degraded mode or whether would it suffer a complete outage under different conditions. This failure model represents a historical-data-based prediction about which particular set of real-world events, out of the entire possible realm of events, may negatively impact the performance of the microservice 110. This intelligently built failure model enables the AI failure mode agent 115 to more efficiently run select failure tests to help build resiliency of the microservice 110.

The test execution recommendation and execution module 225 can determine which tests to run based on the events in the failure model. The test recommendation and execution module 225 can retrieve the appropriate targeted scripts to test the predicted failures of the microservice 110 and its infrastructure, and can program the fault-injection agents 320A, 320B to in the physical deployment to inject faults on request flows that match the fault-injection rules 315. As described above, the application-layer transport protocols and interaction patterns of microservices can be pre-determined, and therefore it is possible to elicit a failure-related reaction from any microservice, irrespective of its application logic or runtime, by manipulating these interactions. From the perspective of a microservice 110 making an API call, failures in a remote microservice or the network can manifest in the form of delayed responses, error responses (e.g., HTTP 404, HTTP 503), invalid responses, connection timeouts and failure to establish the connection. Accordingly, the fault-injection agents 320A, 320B can emulate these incidents. Specifically, the fault-injection agent 320A injects faults into API calls for real and/or incoming to the microservice 110 from downstream resources or microservices, while the fault-injection agent 320B injects faults into API calls for real and/or test traffic outgoing from the microservice 110 to upstream resources or microservices.

The fault-injection agents 320A, 320B can log the API calls made by the microservice 110 during the test and report them to the results analyzer 226. For example, each agent can record the message timestamp and request ID, parts of the message (e.g., status codes, request URI), and fault actions applied to the message, if any. The results analyzer 226 can use these logged calls to generate the report 120 indicating which <operating condition, failure possibility> hypotheses were true (e.g., which events caused failure of the microservice), and which <operating condition, failure possibility> hypotheses were false (e.g., which events did not cause failure of the microservice). This report 120 can be delivered to the user computing device 202.

As described above, the report 120 can include one or more code changes that the AI failure model agent 115 has identified as potentially addressing the observed performance issues. The results analyzer 226 can identify these code changes based on observing the changes between versions of a microservice code that result in overcoming certain failures between successive tests, and my matching the overcome failures with the failures faced by the present microservice during testing. In some implementations, microservices architectures are used in distributed systems that are implanted across on a number of different computing devices and are accessed by users over a network (e.g., cloud computing systems). In order for microservices to remain available in the face of infrastructure outages, developers can seek to guard microservices from failures of its dependencies. Accordingly, the identified code changes may incorporate resiliency design patterns such as timeouts, bounded retries, circuit breakers, and bulkheads. Timeouts ensure that an API call to a microservice completes in a bounded time, to maintain responsiveness and release resources associated with the API call in a timely fashion. Bounded retries handle transient failures in the system by retrying API calls with the expectation that the fault is temporary, with such API calls retried a bounded number of times (possibly using an exponential back-off strategy to avoid overloading the called microservice). Circuit breakers prevent failures from cascading across the microservice chain by transitioning to open mode for a predetermined timeframe when repeated calls to a microservice fail, such that the caller service returns a cached or default response to its upstream microservice. Bulkheads provide fault isolation within a microservice, for example by assigning independent portions of shared resources for each type of dependent microservice being called. These examples are provided to illustrate and not limit the types of functionality that can be imparted to a microservice using the identified code changes.

The user computing device 202 may be provided with a results user interface that presents the report of testing performance as well as any identified code changes that they may make. The user interface can include user-selectable features for the user to adopt a given code change, whereby the AI failure model agent 115 can modify the microservice code 110 according to the selected code change. In some implementations, the AI failure model agent 115 can modify the microservice code 110 according to a possible code change, test the altered microservice code for the failure, and suggest the code change to the user if it improves the performance of the microservice. In other implementations, the user may manually make the code change (or their own code changes inspired by the suggested code change) after observing the report. The code changes made and the results of any subsequent testing can be observed by the data collector 222 and stored in the data store 230.

Figure 4:
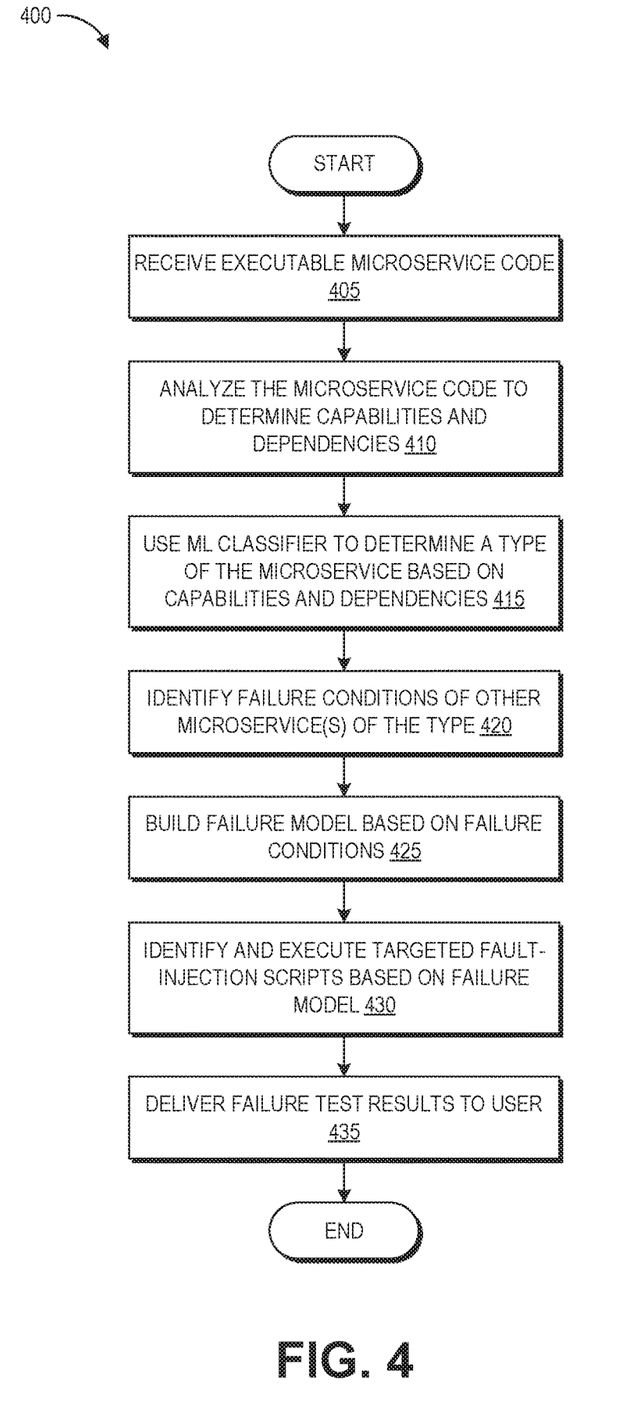
FIG. 4 is a flow diagram of an example process for implementing an artificially intelligent failure model agent to analyze and test a microservice, for example according to the interactions of FIG. 1.

FIG. 4 is a flow diagram of an example process 400 for implementing the AI failure model agent 115 to analyze and test a microservice. The process can be implemented by the AI failure model agent 115.

At block 405, the AI failure model agent 115 can receive the executable code of a microservice, its model definition, and/or its infrastructure. For example, a user can use an onboarding user interface to upload a copy of the code, definition, and/or infrastructure (for remotely-executing implementations), or can use the onboarding user interface to identify a location of a file containing the executable code, definition, and/or infrastructure (for locally-executing implementations).

At block 410, the AI failure model agent 115 can analyze the microservice code, definition, and/or infrastructure to determine the capabilities and dependencies of the microservice. For example, the microservice analyzer 221 can inspect the microservice code to identify the capabilities (e.g., APIs supported, existing metrics emitted by the service and the APIs, service architecture such as event driven or request response) and the resources (e.g., infrastructure such as VIPs, Load balancers, databases, dependent services, immediate code snippets).

At block 415, the AI failure model agent 115 can use a machine learning classifier to determine a type (or multiple types) of the microservice, and/or to cluster the microservice with a group of similar microservices. For example, the identified capabilities and resources can be provided as input features to the machine learning similarities detector 223 to identify the type/similar microservices. The machine learning similarities detector 223 can be a clustering algorithm in some implementations. Initially, the machine learning similarities detector 223 can be seeded with microservices that are human labeled with a particular type label in order to generate the feature list and create clusters of similar microservices. The machine learning similarities detector 223 and data collector 222 can persist historical data in long term storage (e.g., data repository 230) for model building. For example, the data collector 222 can collect metrics discovered for the microservice at block 410 to determine a baseline for the KPIs and resource utilization at a given load, and can cause storage of this data for model building.

At block 420, the AI failure model agent 115 can identify failure conditions of other microservices belonging to the type (or types) in which the present microservice has been classified at block 415. These failure conditions can be identified based on observed behavior of the similar microservices during testing. For example, the failure conditions can be specific operating conditions that caused issues with performance of the similar microservices. As described herein, where the infrastructure of the microservice is analyzed the failure model can also include information relating to predicted failure conditions of the infrastructure.

At block 425, the failure model generator 224 of the AI failure model agent 115 can build a failure model for this microservice based on the observed failure conditions of the similar microservices. As described herein, the failure model represents ways that the microservice can have outages due to changes in load or system behavior, and can include certain operating conditions and associated failure possibilities. For example, the failure model can define the operating conditions under which the microservice can fail to perform its designed functionality, what KPIs of the microservice would be impacted, and whether the service can operate in degraded mode or would it suffer a complete outage under different conditions. Some implementations of the process 400 can output this failure model for display to the user. The failure model can be visually represented as a graph with a prediction line and a point of failure due to a root cause (as shown in FIG. 1), and optionally an indication of a probability or likelihood of that failure occurring.

At block 430, the test recommendation and execution model 225 of the AI failure model agent 115 can identify and execute targeted fault-injection scripts based on the failure model. In some implementations, the test recommendation and execution model 225 can identify a listing of targeted scripts from among a databased of possible targeted scripts and can present this listing to the user. In such implementations, the user can select to run specific ones of the identified tests (or others). In some implementations, the test recommendation and execution model 225 can automatically run the identified tests. The tests can be identified based on correlating data associated with the test (e.g., metadata or historical use data) with a particular operating condition or failure possibility in the failure model. The results of this testing can be stored and used for future classification and failure model building, as well as future recommendations regarding failure testing results. For example, the data collector 222 can collect load and failure injection test results, as well as code and configuration changes made to the microservices between tests that potentially fix issues surfaced by these tests.

At block 435, the results analyzer 226 can deliver the failure test results to the user. As described herein, the results analyzer 226 can provide the user with a report of how the microservice and/or its infrastructure performed with respect to the tested operating condition and failure possibility hypotheses. Further, where failure was observed during testing, the results analyzer 226 can provide the user with instructions regarding how to modify the code of the microservice and/or its infrastructure to mitigate or avoid the failure. For example, the results analyzer 226 can access multiple versions of the executable code for other microservices that have been tested for that failure, where a first version of the code resulted in the failure and a second version of the code did not. The results analyzer 226 can semantically analyze the code to identify the portion that changed between the first and second versions, and can include information regarding this difference in the report. This information can be a general indication of where/how the code can be modified, or may be more specific information regarding executable code to use to alter the microservice. The results analyzer 226 can also include a feedback mechanism to identify when the user accepts the exact change suggested, or makes a similar change, to determine whether the code change information should continue being presented to users.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process 210, 255 or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks and modules described in connection with the embodiments disclosed herein can be implemented or performed by a machine, such as a processor device, a DSP, an ASIC, an FPGA, or other programmable logic device, discrete gate or transistor logic, discrete hardware components, or any combination thereof designed to perform the functions described herein. Moreover, the various illustrative logical blocks, modules, routines, and algorithm steps described in connection with the embodiments disclosed herein can be implemented as electronic hardware (e.g., ASICs or FPGA devices), computer software that runs on computer hardware, or combinations of both. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
    a memory storing instructions for implementing an artificial intelligence (AI) failure model; and
    one or more processors in communication with the memory, the one or more processors configured by the instructions to at least:
    receive executable code of a microservice for failure model testing;
    analyze the executable code of the microservice to determine a characteristic of the microservice;
    use a machine learning (ML) classifier to determine a type of the microservice from among a plurality of microservice types based at least in part on the characteristic of the microservice;
    identify a similar microservice that also belongs to the type of the microservice;
    based at least in part on observed performance of the similar microservice, generate a failure model specifying an operating condition and a failure possibility associated with the microservice;
    identify, from among a plurality of targeted scripts, a targeted script that simulates the operating condition specified in the failure model;
    execute the targeted script in response to identifying the targeted script that simulates the operating condition in the failure model; and
    cause output of a failure test user interface on a user computing device, where in the failure test user interface represents the targeted script and a result of executing the targeted script in response to identifying the targeted script that simulates the operating condition in the failure model.

2. The system of claim 1, wherein the one or more processors are further configured by the instructions to at least populate the failure test user interface with instructions for modifying executable code of the microservice to mitigate the failure possibility.

3. The system of claim 2, wherein the one or more processors are further configured by the instructions to at least:
    access a first version and a second version of executable code of the similar microservice;
    determine that the first version of the executable code for the similar microservice that resulted in a failure related to the failure possibility and the second version of the executable code for the similar microservice that did not result in the failure;
    determine a difference between the first version and the second version of the executable code for the similar microservice; and
    generate the instructions based at least in part on the difference.

4. The system of claim 1, wherein the characteristic of the microservice is at least one of a capability of the microservice or a dependency of the microservice.

5. A computer-implemented method for implementing an artificial intelligence (AI) failure model, the computer-implemented method comprising:
    receiving executable code of a microservice for failure model testing;
    analyzing the executable code of the microservice to determine a characteristic of the microservice;
    using a machine learning (ML) classifier, determining a type of the microservice from among a plurality of microservice types based at least in part on the characteristic of the microservice;
    identifying a similar microservice that also belongs to the type of the microservice;
    based at least in part on observed performance of the similar microservice, generating a failure model specifying an operating condition and a failure possibility for the microservice;
    identifying, from among a plurality of targeted scripts, a targeted script that simulates the operating condition specified in the failure model;
    executing the targeted script in response to identifying the targeted script that simulates the operating condition in the failure model; and
    causing output of information representing the targeted script and a result of executing the targeted script in response to identifying the targeted script that simulates the operating condition in the failure model.

6. The computer-implemented method of claim 5, further causing output of instructions for modifying executable code of the microservice to mitigate the failure possibility.

7. The computer-implemented method of claim 6, further comprising:
    accessing multiple versions of executable code of another microservice that was tested relating to the operating condition and failure possibility, the multiple versions including (i) a first version of the executable code that resulted in a failure related to the failure possibility, and (ii) a second version of the executable code that did not result in the failure;
    determining a difference between the first version and the second version of the executable code; and
    generating the instructions to include information representing the difference.

8. The computer-implemented method of claim 5, further comprising:
    identifying a plurality of similar microservices belonging to the type; and
    generating the failure model based at least in part on observed performance of the plurality of similar microservices.

9. The computer-implemented method of claim 8, further comprising:
    identifying a plurality of different operating conditions and associated failure possibilities based at least in part on the observed performance of the plurality of similar microservices; and
    including the plurality of different operating conditions and associated failure possibilities in the failure model.

10. The computer-implemented method of claim 9, further comprising, for each of the plurality of different operating conditions and associated failure possibilities, identifying a corresponding targeted script to use for testing the microservice.

11. The computer-implemented method of claim 5, further comprising:
identifying that the microservice belongs to a second type;
identifying a second similar microservice that belongs to the second type; and
based at least in part on observed performance of the second similar microservice, including a second operating condition and associated failure possibility in the failure model for the microservice.

12. A non-transitory computer-readable medium comprising computer-executable instructions for implementing an artificial intelligence (AI) failure model that, when executed on a computing system, cause the computing system to perform operations comprising:
receiving executable code of a microservice for failure model testing;
analyzing the executable code of the microservice to determine a characteristic of the microservice;
using a machine learning (ML) classifier, determining a type of the microservice from among a plurality of microservice types based on the characteristic of the microservice;
identifying a similar microservice that also belongs to the type of the microservice;
based at least in part on observed performance of the similar microservice, generating a failure model specifying an operating condition and a failure possibility for the microservice;
identifying, from among a plurality of targeted scripts, a targeted script that simulates the operating condition specified in the failure model;
automatically executing the targeted script in response to identify the target script that simulates the operating condition in the failure model; and
causing output of an indication of the targeted script and represents a result of executing the targeted script in response to identify the target script that simulates operation condition in the failure model to a user.

13. The non-transitory computer-readable medium of claim 12, the operations further comprising causing output of information representing the failure model to the user.

14. The non-transitory computer-readable medium of claim 12, the operations further comprising:
executing the targeted script to simulate the operating condition specified in the failure model; and
causing output of information representing a result of simulating the operating condition.

15. The non-transitory computer-readable medium of claim 14, the operations further comprising:
additionally receiving information representing an infrastructure of the microservice; and
generating the failure model to additionally specify an additional operating condition and additional associated failure possibility for the infrastructure.

16. The non-transitory computer-readable medium of claim 14, the operations further comprising:
identifying, from among the plurality of targeted scripts, an additional targeted script that simulates the additional operating condition;
executing the additional targeted script; and
based on a result of executing the additional targeted script, causing output of instructions for modifying the infrastructure to mitigate the additional failure possibility.

17. The non-transitory computer-readable medium of claim 12, the operations further comprising causing output of instructions for modifying executable code of the microservice to mitigate the failure possibility.

18. The non-transitory computer-readable medium of claim 17, the operations further comprising:
accessing multiple versions of executable code of another microservice that was tested relating to the operating condition and failure possibility, the multiple versions including (i) a first version of the executable code that resulted in a failure related to the failure possibility, and (ii) a second version of the executable code that did not result in the failure;
determining a difference between the first version and the second version of the executable code; and
generating the instructions to include information representing the difference.

* * * * *